US011411773B2

(12) United States Patent
Lau et al.

(10) Patent No.: US 11,411,773 B2
(45) Date of Patent: Aug. 9, 2022

(54) NETWORK CACHING OF OUTBOUND CONTENT FROM ENDPOINT DEVICE TO PREVENT UNAUTHORIZED EXTRACTION

(71) Applicants: AT&T Mobility II LLC, Atlanta, GA (US); AT&T Intellectual Property I, L.P., Atlanta, GA (US)

(72) Inventors: Erie Lai Har Lau, Redmond, WA (US); Sangar Dowlatkhah, Alpharetta, GA (US); Thomas J. Will, Skillman, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 108 days.

(21) Appl. No.: 16/916,081

(22) Filed: Jun. 29, 2020

(65) Prior Publication Data
US 2020/0336335 A1 Oct. 22, 2020

Related U.S. Application Data

(63) Continuation of application No. 15/170,680, filed on Jun. 1, 2016, now Pat. No. 10,700,894.

(51) Int. Cl.
*H04L 12/46* (2006.01)
*H04L 67/568* (2022.01)
(Continued)

(52) U.S. Cl.
CPC .......... *H04L 12/4641* (2013.01); *H04L 63/20* (2013.01); *H04L 67/2842* (2013.01); *H04W 84/042* (2013.01)

(58) Field of Classification Search
CPC . H04L 12/4641; H04L 63/20; H04L 67/2842; H04W 84/042
(Continued)

(56) References Cited

U.S. PATENT DOCUMENTS 6,385,642 B1 ‡ 5/2002 Chian ..................... H04L 67/42
709/20
6,826,698 B1 ‡ 11/2004 Minkin ............... H04L 63/0263
709/22
(Continued)

FOREIGN PATENT DOCUMENTS

| EP | 1175752 | ‡ | 1/2002 |
| WO | WO 2006/057852 | ‡ | 6/2006 |
| WO | WO 2013074209 | ‡ | 5/2013 |

OTHER PUBLICATIONS

Scaling Your Cisco IronPort Web Security Appliance Using Cisco Application Control Engine, Cisco, cisco.com, Nov. 5, 2010. http://www.cisco.com/c/en/US/products/collateral/interfaces-modules/services- modules/guide c07-623533.html Discloses a method of monitoring traffic and data transfers by users in an intermediate web cache.‡

(Continued)

*Primary Examiner* — Dereena T Cattungal (57) ABSTRACT

Methods, computer-readable media and devices are disclosed for storing content from an endpoint device in a network cache. For example, a processor receives a security policy for the endpoint device defining a type of content for storing in the network cache, and determines that traffic from the endpoint device includes content of the content type for storing in the network cache. When it is determined that the traffic includes the content of the content type for storing in the network cache, the processor instantiates the network cache, stores the content in the network cache, and sends a notification to a designated device. The notification includes at least one parameter associated with the content. The processor further receives a decision from the designated device and performs a task regarding the content in response to the decision.

20 Claims, 3 Drawing Sheets

(51) Int. Cl.
*H04L 9/40* (2022.01)
*H04W 84/04* (2009.01)

(58) Field of Classification Search
USPC .................................................. 726/1
See application file for complete search history.

(56) References Cited

U.S. PATENT DOCUMENTS

| | | | | |
|---|---|---|---|---|
| 7,035,828 | B2 ‡ | 4/2006 | Ketonen | G06Q 10/10 704/8 |
| 7,237,239 | B1 ‡ | 6/2007 | Goel | G06F 8/71 707/999.202 |
| 7,747,662 | B2 | 6/2010 | Vivekanand | |
| 7,908,653 | B2 ‡ | 3/2011 | Brickell | G06F 21/51 726/22 |
| 8,041,390 | B2 ‡ | 10/2011 | Jeong | H04N 1/00159 455/55 |
| 8,136,149 | B2 ‡ | 3/2012 | Freund | H04L 63/20 726/11 |
| 8,239,923 | B2 ‡ | 8/2012 | Kirshnan | H04L 63/0428 726/5 |
| 8,527,705 | B2 ‡ | 9/2013 | Gladwin | G06F 11/10 711/11 |
| 8,539,561 | B2 ‡ | 9/2013 | Gupta | G06F 21/62 726/6 |
| 8,584,234 | B1 * | 11/2013 | Sobel | G06F 21/56 726/22 |
| 8,599,788 | B2 ‡ | 12/2013 | Song | H04W 36/023 370/33 |
| 8,601,579 | B2 ‡ | 12/2013 | Krsti | G06F 21/53 726/22 |
| 8,806,607 | B2 ‡ | 8/2014 | Archer | H04L 67/025 726/13 |
| 8,909,202 | B2 ‡ | 12/2014 | Luna | H04L 67/306 455/41 |
| 8,914,514 | B1 * | 12/2014 | Jenkins | H04L 67/10 709/226 |
| 8,966,632 | B1 * | 2/2015 | Huang | G06F 21/53 726/24 |
| 9,026,581 | B2 ‡ | 5/2015 | Wheeler | H04L 65/403 709/20 |
| 9,032,097 | B2 ‡ | 5/2015 | Albanese | H04L 67/10 709/24 |
| 9,173,104 | B2 ‡ | 10/2015 | Raleigh | H04L 51/046 |
| 10,728,252 | B2 * | 7/2020 | Desai | H04L 67/2814 |
| 10,972,487 | B2 * | 4/2021 | Sharma | H04L 63/1416 |
| 2006/0230454 | A1 ‡ | 10/2006 | Achanta | G06F 21/566 726/24 |
| 2007/0038637 | A1 * | 2/2007 | Taneja | G06F 21/563 |
| 2009/0064329 | A1 | 3/2009 | Okumura et al. | |
| 2009/0168795 | A1 ‡ | 7/2009 | Segel | H04L 67/104 370/429 |
| 2010/0199299 | A1 ‡ | 8/2010 | Chang | H04N 7/17318 725/32 |
| 2011/0282997 | A1 ‡ | 11/2011 | Prince | H04L 63/1416 709/226 |
| 2012/0185937 | A1 * | 7/2012 | Levy | H04L 63/0245 726/22 |
| 2012/0324113 | A1 * | 12/2012 | Prince | H04L 69/40 709/226 |
| 2013/0031600 | A1 * | 1/2013 | Luna | G06F 21/56 726/1 |
| 2013/0097706 | A1 ‡ | 4/2013 | Titonis | H04W 12/12 726/24 |
| 2015/0120859 | A1 ‡ | 4/2015 | Kondo | G06F 12/0897 709/21 |
| 2015/0128205 | A1 * | 5/2015 | Mahaffey | H04L 63/105 726/1 |
| 2015/0363602 | A1 ‡ | 12/2015 | Willis | G06F 21/6281 726/26 |
| 2015/0371142 | A1 * | 12/2015 | Jain | G06N 5/048 706/52 |
| 2015/0372933 | A1 * | 12/2015 | Cai | H04N 21/6371 370/329 |
| 2016/0050159 | A1 * | 2/2016 | Cook | G06F 9/547 709/226 |
| 2016/0294773 | A1 ‡ | 10/2016 | Yu | H04L 63/1425 |
| 2016/0301593 | A1 * | 10/2016 | Blair | H04L 41/50 |
| 2017/0178245 | A1 ‡ | 6/2017 | Rodkey | G06Q 40/10 |
| 2018/0234831 | A1 ‡ | 8/2018 | Liu | H04W 8/005 |

OTHER PUBLICATIONS

"Configuring Network Scan Settings in Symantec Endpoint Protection," Symantec, support.symantec.com, TECH95508 Jun. 8, 2015 https://support.symantec.com/en US/article.TECH95508.html Discloses a method of scanning and securing data utilizing a network cache.‡

"Configuring Networked Scan Settings in Symantec Endpoint Protection," Symantec, support.symantec.com, TECH95508 , Jun. 8, 2015 https://support.symantec.com/en_US/article.TECH95508.html.

"Scaling Your Cisco IronPort Web Security Appliance Using Cisco Application Control Engine," Cisco, cisco.com, Nov. 5, 2010. http://www.cisco.com/c/en/us/products/collateral/interfaces-modules/services-modules/guide_c07-623533.html Discloses a method of monitoring traffice and data transfers by users in an intermediate web cache.

\* cited by examiner
‡ imported from a related application

NETWORK CACHING OF OUTBOUND
CONTENT FROM ENDPOINT DEVICE TO
PREVENT UNAUTHORIZED EXTRACTION

This application is a continuation of U.S. patent application Ser. No. 15/170,680, filed on Jun. 1, 2016, now U.S. Pat. No. 10,700,894, which is herein incorporated by reference in its entirety.

The present disclosure relates generally to endpoint device and network security, and more particularly to regulating content extraction from endpoint devices using network caches.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Upgrading a telecommunication network to a software defined network (SDN) architecture may involve replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like, may be instantiated from the common resource pool.

The present disclosure broadly discloses methods, computer-readable media and devices for storing content from an endpoint device in a network cache, e.g., within a telecommunications service provider network. In one example, control over the transmission of content from an endpoint device to a destination via the telecommunications service provider network may be controlled by a number of entities, such as a user or owner of the endpoint device, an enterprise associated with the endpoint device, or the telecommunications service provider network. In one example, the present disclosure may address the possibility that malware or other codes on an endpoint device, or on a device in communication with the endpoint device, may surreptitiously exfiltrate content from the endpoint device. For example, a user of the endpoint device may download an application which includes a malicious code to impermissibly gather information of the user. The code may also use the endpoint device's own capabilities to transmit the information to another device over a network. In another example, a parent may wish to control the sending of content from an endpoint device that a child has been allowed to use. In another example, a hospital may wish to verify that protected health information (PHI) is being sent to an appropriate destination from a doctor's endpoint device or from another endpoint device within the hospital's computer network. In another example, a user may have a blood pressure or glucose measuring device that sends data to a server via the telecommunications service provider network. However, the user may wish for the data to be blocked from being sent to the server in some situations. For example, if a child picks up a parent's blood pressure measuring device and starts playing around with it, the parent would not want the data collected to be transmitted to the server and affect the accuracy of the legitimate records of blood pressure readings.

In one example, the present disclosure may instantiate a network cache within the telecommunications service provider network when certain types of data are sent from the endpoint device. In one example, policies for caching of content from an endpoint device may be provided by the owner or user of the endpoint device, by an enterprise associated with the endpoint device, or by the telecommunications service provider network. A security policy may identify types of content for which caching should be applied, such as for pictures, videos, documents, or other media. A security policy may identify one or more management devices to which to send notifications of caching of content in accordance with the security policy. For example, content may be diverted to the network cache by other components within the telecommunications service provider network and a notification may be sent to a management device that the content has been diverted. Management devices may comprise, for example, the endpoint device itself, other devices associated with a user of the endpoint device, devices of an enterprise associated with the endpoint device and/or the user, or other devices within the telecommunications service provider network. In one example, the present disclosure may receive a response from a management device that selects an action to take with respect to the content that is stored in the network cache. For example, the response may request that the content be sent on to the destination, that the content be dropped or blocked, or that the content be sent to a security device for further processing.

A policy may also define a default action if there is no response from a management device within a designated time period. For instance, a default action may be to permit the content to be sent to the destination, to drop the content, to send the content to a security device for further processing, to send a notification to one or more secondary management devices, or to continue to store the content for a longer time period. In one example, with respect to a security policy for an endpoint device, different management devices and different default actions may be specified for different types of content. In one example, a security policy may be changed such that different types of content may be cached differently, or no longer cached, such that different default actions may be specified, such that a different management device or management devices may receive notifications, and so forth.

In one example, the present disclosure may implement a hierarchy of security policies which may be applied to content from the endpoint device. Thus, if there is a conflict between what is specified in the security policies, such as types of content to cache, management device(s) to which to send notifications, and/or default actions to take, the security policy having a greater precedence may be followed. For instance, the telecommunications service provider network may have a default security policy that may be broadly applicable to all endpoint devices, or endpoint devices in one or more particular categories, e.g., based upon device type, location, service level, whether the endpoint device is associated with a particular enterprise or class of enterprises, such as a hospital, a law firm, a governmental agency, and so forth. An enterprise may also have a security policy or policies that may apply to endpoint devices associated with the enterprise. For instance, corporate employees may utilize personal devices on an enterprise network. However, the enterprise may want to control the flow of outbound content from such endpoint devices, or may require employees to have an additional check on outbound content via the caching of content in accordance with the present disclosure. Alternatively, or in addition, a user may provide a security policy for the user's endpoint device. Thus, for example, the enterprise's security policy may take precedence over the user's personal security policy when the endpoint device is connected to the telecommunications service provider network via the enterprise network. However, the user's personal security policy may take precedence over the default security policy of the telecommunications service provider network. Alternatively, or in addition, the enterprise security policy may be disregarded when the user's personal endpoint device is not connected to the telecommunications service provider network via the enterprise network. The foregoing is just one example of how security policy precedence may be arranged in accordance with the present disclosure.

Thus, in any of the above examples, the present disclosure may provide a user or other entities with a time window in which to confirm or deny the transmission of content from an endpoint device to a destination by instantiating a temporary network cache in which to store the content. These and other aspects of the present disclosure are discussed in greater detail below in connection with the examples of FIGS. 1-3.

Figure 1:
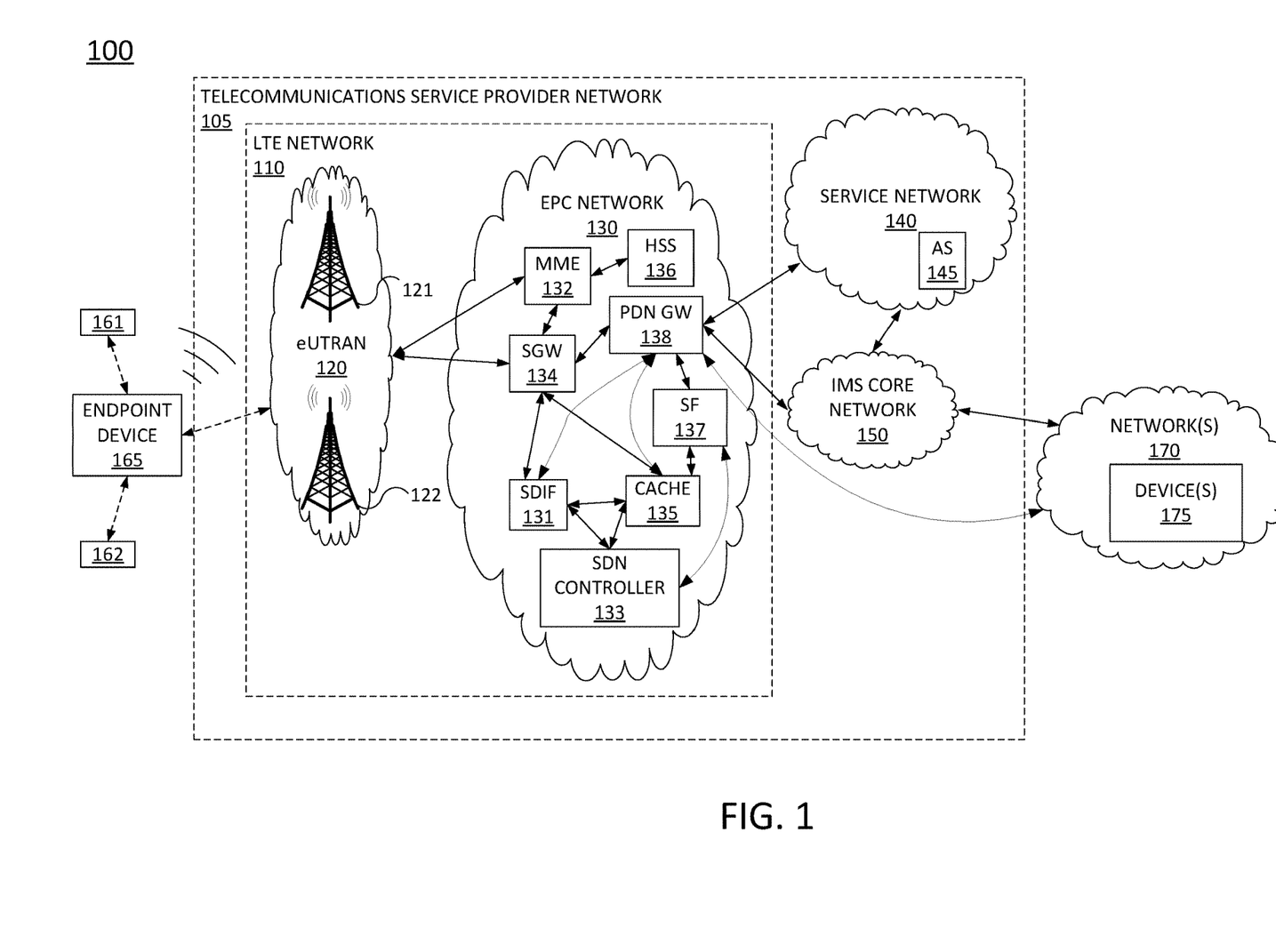
FIG. 1 illustrates an example system related to the present disclosure.
Figure 3:
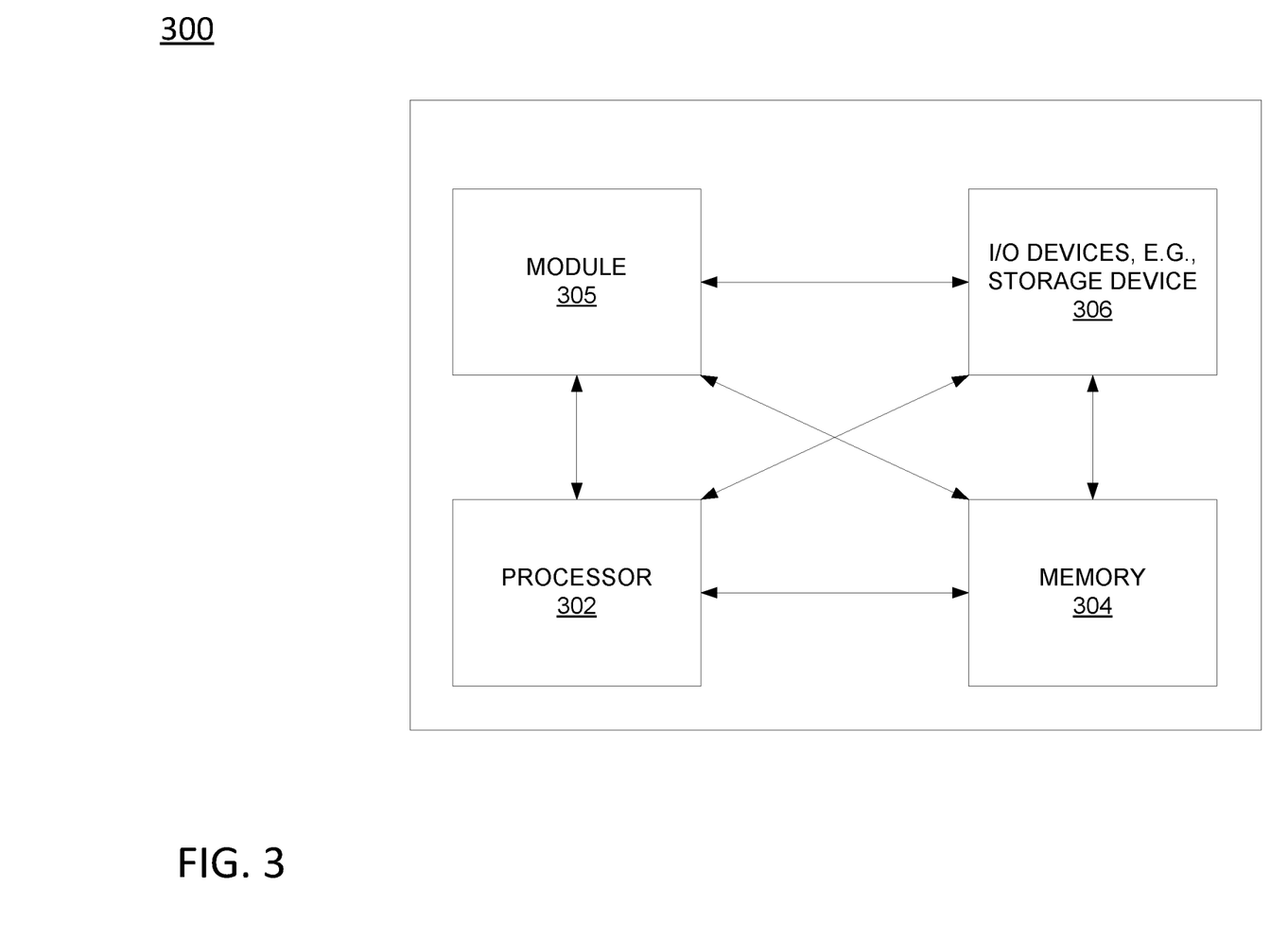
FIG. 3 illustrates an example high-level block diagram of a computer specifically programmed to perform the steps, functions, blocks, and/or operations described herein.

To better understand the present disclosure, FIG. 1 illustrates an example network, or system 100 that may implement embodiments of the present disclosure for storing content from an endpoint device in a network cache. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint device 165 with application server (AS) 145 in service network 140, with devices 175 in networks 170, and/or with other components of telecommunication service provider network 105. The endpoint device 165 may comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device"). As illustrated in FIG. 1, devices 161 and 162 may also connect to various destinations over telecommunications service provider network 105 via endpoint device 165. For example, devices 161 and 162 may comprise wearable sensor devices and/or near field communication (NFC) devices. For instance, devices 161 and 162 may each comprise a heart rate monitor, a pedometer, a gyroscope, a temperature sensor, a glucose monitor, or the like. In other examples, devices 161 and 162 may comprise a "smart device" such as an NFC-enabled appliance, a headset, a wristwatch, and so forth. In one example, devices 161 and 162 may connect to endpoint device 161 via Institute for Electrical and Electronics Engineers (IEEE) 802.15.2 based communications (e.g., Bluetooth), IEEE 802.15.4 based communications (e.g., ZigBee), IEEE 802.11 based communications (e.g., Wi-Fi), via other standards-based or proprietary wireless communications, and so forth. In various examples, endpoint devices 161 and 162 may comprise either legitimate devices that are authorized to connect to endpoint device 165, or may comprise malicious devices that may gain impermissible access to endpoint device 165 and its contents. It should be noted that for illustrative purposes, two devices 161 and 162 and one endpoint device 165 are shown in the example of FIG. 1. However, in other, further, and different examples, any number of endpoint devices and other devices connected thereto may be deployed in the system 100, or in a similar system in accordance with present disclosure.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint device 165, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices, such as application server (AS) 145 for providing services to subscribers, customers, and or users. For example, telecommunications service provider network 105 may provide a cloud storage service, web server hosting, and other services. As such, service network 104 may represent aspects of telecommunications service provider network 105 where infrastructure for supporting such services may be deployed. In one example, AS 145 may comprise a computing system, such as computing system 300 depicted in FIG. 3, specifically configured to provide one or more service functions, in accordance with the present disclosure. Although a single application server, AS 145, is illustrated in service network 140, it should be understood that service network 140 may include any number of components to support one or more services that may be provided to one or more subscribers, customers, or users by the telecommunications service provider network 105.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one example, the other networks 170 may represent the Internet in general. Devices 175 may include servers, such as storage devices comprising computer-readable media for storing data, e.g., volatile or non-volatile memory such as random access memory (RAM), a magnetic-based hard drive, a solid-state drive, and so forth. Devices 175 may also include personal computers, desktop computers, laptop computers, personal digital assistants (PDAs), tablet computing devices, or any other wireless and/or wired communication enabled computing device. For instance, devices 175 may include a device of an enterprise for providing security management functions, e.g., for providing security policies for endpoint devices managed by or otherwise associated with the enterprise and/or for receiving and responding to notifications regarding such endpoint devices. Alternatively, or in addition, devices 175 may comprise a device associated with endpoint device 165. For instance, a user may own both the endpoint device 165 and one of the devices 175. In addition, the user may use one of the devices 175 for management of security functions related to endpoint device 165. In one example, one or more of the devices 175 may comprise a computing system, such as computing system 300 depicted in FIG. 3, specifically configured to provide one or more functions for storing data or for providing security management functions, in accordance with the present disclosure.

In one example, system 100 may also include a security detection and interception function (SDIF) 131, e.g., a dedicated security server, for monitoring the transmission of content from endpoint devices, for instantiating network caches, for implementing security policies, for sending notifications and receiving responses, and other operations in accordance with the present disclosure. In one example, SDIF 131 may receive security policies from endpoint devices, such as endpoint device 165, from management devices, such as one of the devices 175, and so forth. A security policy for endpoint device 165 may specify, for example, one or more content types for caching, an identification of one or more monitoring devices to which to send notifications of the caching and parameters relating to the content that is cached, one or more default actions to take regarding the one or more content types in the event that no response is received from a monitoring device, and so forth. In one example, SDIF 131 may comprise a security computing system, such as computing system 300 depicted in FIG. 3, specifically configured to provide one or more functions for storing content from an endpoint device in a network cache, in accordance with the present disclosure.

In one example, SDIF 131 may implement "probes" to other components within EPC network 130 and/or eUTRAN 120. For example, SDIF 131 may maintain communications with components such as, SGW 134, PDN GW 138, eNodeBs 121 and 122, and so forth to receive information regarding traffic, such as signaling messages, packet headers, and/or content that may be processed by the respective components. As referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through the system 100. In one example, components of telecommunications service provider network 105 may be configured to perform a deep packet inspection (DPI) to determine a type of content in traffic that is being processed by such components. In another example, these components may be configured to determine a type of content based upon other parameters associated with the content and/or the traffic. For instance, network elements may determine a type of content based upon information contained in packet headers of the traffic, based upon the sending application on an endpoint device, based upon a port number, and so on. In one example, the configuring of components in telecommunications service provider network 105 may comprise the SDIF 131 pushing security policies to the components such that content in traffic matching a content type designated in a security policy may be detected by the components and alerted to the SDIF 131. In another example, the components may determine parameters associated with the traffic and/or the content and send the parameters to the SD IF 131, where the SDIF 131 may then determine if the content is of a type that should be cached for the sending endpoint device in accordance with one or more security policies associated with the endpoint device. In still another example, SGW 134, PDN GW 138, eNodeBs 121 and 122, or other components of telecommunications service provider network 105 may be configured to copy traffic to the SDIF 131, where the SDIF 131 may determine a type of content, a number of files, file types, a source, a destination, and other parameters associated with the content using DPI, packet header inspection, and so on.

In one embodiment, when it is determined that the content is of a type that is to be cached for the sending endpoint device (in this example, endpoint device 165), the SDIF 131 may instruct the software defined network (SDN) controller 133 to dynamically instantiate a network cache 135. In a software defined network (SDN), a controller may instantiate various components on shared hardware (e.g., network function virtualization infrastructure (NFVI)/host device(s)) that may be physically located in various data centers or in other locations. Multiple components may be instantiated on a single physical device, or on several devices in a single data center or in different data centers. In accordance with the present disclosure, SDN controller 133 may instantiate network cache 135 on one or more host devices in response to an instruction from SDIF 131. For instance, the SDN controller 131 may configure NFVI/host device(s) to function as a network cache in accordance with the present disclosure. As used herein, the terms "instantiate," "configure," and "reconfigure" may refer to programming or loading a computing device with computer-readable/computer-executable instructions, code, and/or programs, e.g., in a memory, which when executed by a processor of the computing device, may cause the computing device to perform various functions. In addition, such terms may comprise provisioning, allocating or assigning other resources of a computing device to a component, such as all or a portion of a memory, an attached data storage unit, and so forth.

In addition to instantiating network cache 135 via SDN controller 133, SDIF 131 may also instruct one or more components of telecommunications service provider network 105 to divert content to the network cache 135. For instance, different routings may be configured in the telecommunications service provider network 105 for different types of content and for different endpoint devices. For example, components (e.g., routers, switches, any number of gateways, etc.) within the telecommunications service provider network 105 may be configured to identify content of a particular content type from a particular endpoint device, and to forward the content to network cache 135, while routing other content that is not slated to be cached in a different manner through the telecommunications service provider network 105. For instance, content that is not to be cached for endpoint device 165 may be sent from SGW 134 to PDN GW 138 and on to one of service network 140, IMS core network 150, or other networks 170, e.g., without diversion to the network cache 135.

In the example of FIG. 1, a security policy for endpoint device 165 may specify that all audio content being sent from the endpoint device 165 should be cached and that a notification be sent to the endpoint device 165 itself. In other words, endpoint device 165 may function as a monitoring device for its own outbound traffic and/or content. Continuing with such an example, an unauthorized access to endpoint device 165 may be gained by device 161, which may attempt to send several audio files of endpoint device 165 to one of the devices 175. For instance, to avoid detection by other security mechanisms, device 161 may attempt to cause endpoint device 165 to send only five audio files in a single transmission per hour. Alternatively, or in addition, device 161 may attempt to exfiltrate audio files while avoiding detection by causing endpoint device 165 to send an extra two audio files to one of devices 175 each time a legitimate application on device 161 attempts to send one or more audio files to any destination. In one example, the outbound traffic may be determined to be audio content by SGW 134, PDN GW 138, or another component of telecommunications service provider network 105 and alerted to SDIF 131. In one example, the content of the outbound traffic or parameters related to the outbound traffic or content may be copied to SDIF 131, where the SDIF 131 may then determine that the outbound traffic comprises audio content. In such case, SDIF 131 may cause SDN controller 133 to instantiate network cache 135 for the outbound audio content from endpoint device 165, and may instruct SGW 134, PGW 138, and/or other components in telecommunications service provider network 105 to divert the audio content from endpoint device 165 to the network cache 135. In addition, SDIF 131 may send a notification to the endpoint device 165. The notification may identify the content and may provide various parameters relating to the content, such as, a volume or quantity of the content, the protocol(s) utilized, the Internet Protocol (IP) address(es) and/or the port number(s) contained within headers of data units in the traffic, an identification of the destination device, a file size of at least one file, a file name of at least one file, a file type of at least one file, an identification of an application sending the content from the endpoint device, and so forth.

Accordingly, a user of endpoint device 165 may determine whether all or a portion of the content is authorized (or unauthorized) and may request that the SDIF 131 take appropriate action in response. For instance, based upon a response from the endpoint device 165, SDIF 131 may instruct the network cache 135 to release all or a portion of the content to the intended destination(s), to block or drop all or a portion of the content, to forward all or a portion of the content to a security function 137, e.g., a server or other computing device where an antivirus/antimalware scan can be conducted, where aspects of the content or parameters of the content can be logged, such as identifying information of an intended destination, and so forth. Alternatively, or in addition, security function 137 may comprise a server functioning as a sandbox, a quarantine storage, a honeypot, or the like. The foregoing is just one example, of how caching for endpoint device 165 may be implemented in accordance with a security policy. For instance, in other examples, a different monitoring device may be designated, a different type of content may be designated for caching, and so on.

It should be noted that the caching of content that matches the content type designated in a security policy is without regard to the intended destination of the content. In other words, even if the destination is a trusted domain or is otherwise considered a safe destination, the sending of the content to such a destination may still be unintentional. For example, device 162 may comprise a blood pressure measuring device that may pass measurements to AS 145 in service network 140 via endpoint device 165. For instance, AS 145 may represent a data repository for a doctor, a hospital, or the like which may provide medical care to a patient/user of endpoint device 165. However, a child of the user may gain hold of the device 162 and begin playing with the device, which may generate false readings. In addition, device 162 may attempt to send the false readings to AS 145 via endpoint device 165. Thus, in accordance with a security policy of the user/patient, a medical provider, or the like, this type of content may be identified in outbound traffic from endpoint device 165, a network cache may be dynamically created, and the content may be placed in the instantiated cache. A notification to endpoint device 165 or another monitoring device may then alert the user/patient that readings are being transmitted. The user may then respond that the content should be dropped and not sent to the destination, e.g., AS 145, due to the user realizing that the child may have inadvertently triggered the transmission.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, and IMS core network 150 are omitted for clarity, including gateways or border elements providing connectivity between such networks. Similarly, due to the relatively large number of connections available between devices in the system 100, various links between MME 132, SGW 134, eNodeBs 111 and 112, PDN GW 138, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, and the like, or a future technology or standard-based network). Similarly, although the SDIF 131, SDN controller 133, cache 135, and security function 137 are illustrated as components within EPC network 130 having a particular configuration, in other examples, any one or more of these components may be deployed in a different configuration. For example, the cache 135 may be placed between SGW 134 and PDN GW 138, or may be placed within IMS core network 160, service network 140, and so on. In still another example, SDIF 131 may reside within service network 140 and may communicate with components in EPC network 130 via PDN GW 138, for example. Thus, these and other modifications are all contemplated within the scope of the present disclosure.

Figure 2:
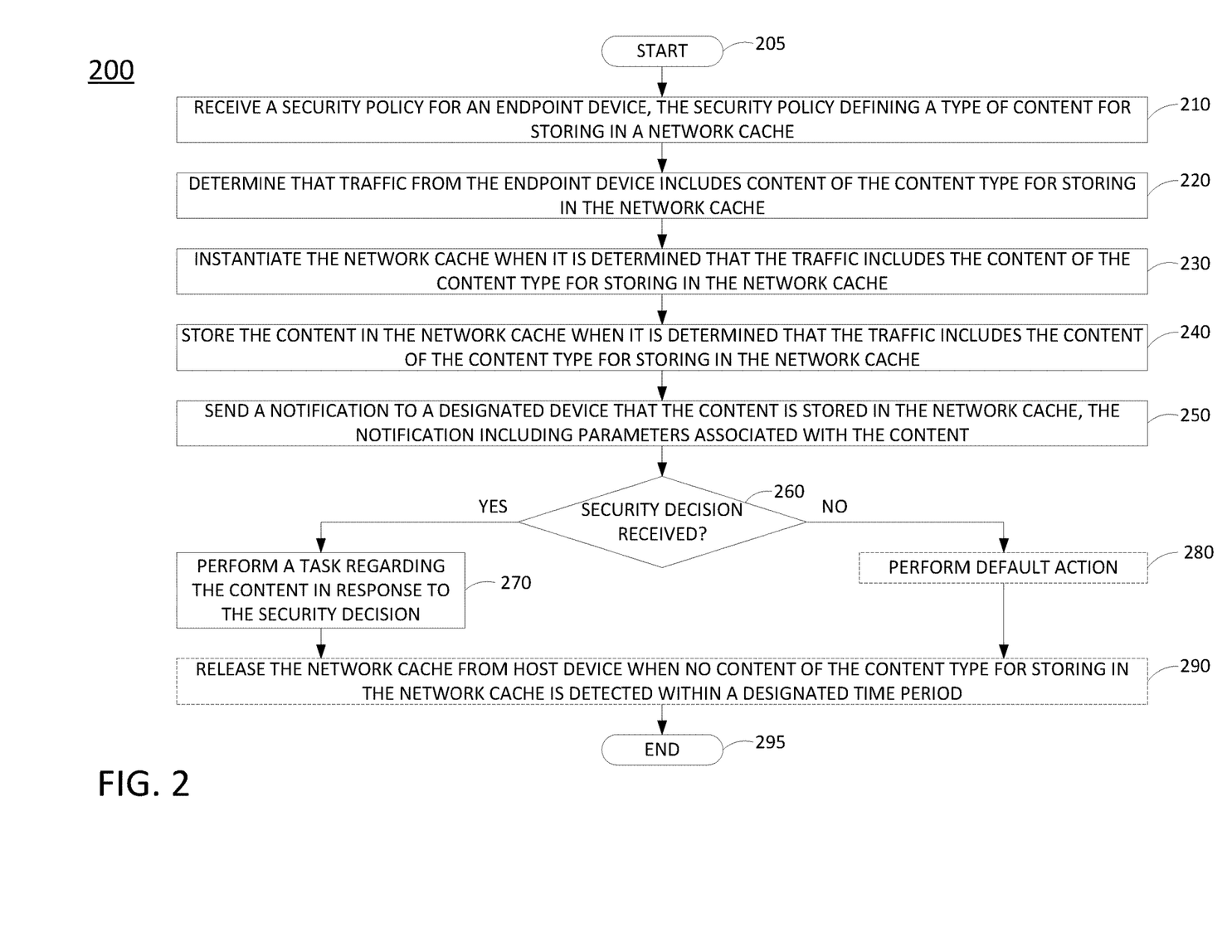
FIG. 2 illustrates a flowchart of an example method for storing content from an endpoint device in a network cache.

FIG. 2 illustrates a flowchart of an example method 200 for storing content from an endpoint device in a network cache, in accordance with the present disclosure. In one example, steps, functions and/or operations of the method 200 may be performed by a network-based device, such as SDIF 131 in FIG. 1, or SDIF 131 in conjunction with other components of the system 100. In one example, the steps, functions, or operations of method 200 may be performed by a computing device or system 300, and/or processor 302 as described in connection with FIG. 3 below. For instance, computing device or system 300 may represent an SDIF of the present disclosure. For illustrative purposes, the method 200 is described in greater detail below in connection with an example performed by a processor, such as processor 302. The method begins in step 205 and proceeds to step 210.

At step 210, the processor may receive a security policy for an endpoint device. The security policy may define a type of content from the endpoint device for storing in a network cache. For instance, the type of content may comprise photographic content, image content, video content, audio content, or multimedia content. In one example, the type of content may comprise protected health information (PHI), e.g., PHI in general, or one or more particular kinds of PHI, such as blood pressure readings, glucose readings, heart rate readings, and the like. In one example, the security policy may be received from the endpoint device. In another example, the security policy may be received from another device associated with a user of the endpoint device, from a device of an enterprise associated with the user and/or the endpoint device, or from a device of a network in which the processor is deployed. In addition, the security policy may identify one or more management devices to which to send notifications of caching of data in accordance with the security policy. The security policy may also define a default action if there is no response from a management device within a designated time period. In one example, if the security policy for the endpoint device may define more than one type of content for caching, different management devices for receiving notifications, and different default actions for the different types of content. For example, network caching may be desired for certain types of activities or content, such as for sending files, videos, or pictures. However, the user or an enterprise that is managing the endpoint device may not be interested in network caching of emails or text messages, for instance. In one example, the security policy may also define one or more additional content types for automatic action, such as for automatically forwarding to a destination device, or for automatically blocking, dropping, or quarantining, for instance.

At step 220, the processor may determine that traffic from the endpoint device for a destination device includes content of the content type for storing in the network cache, e.g., in accordance with the security policy for the endpoint device. In one example, step 220 may include the processor receiving traffic from other components within the network. For instance, a serving gateway, a packet data network gateway, and so forth, may copy the traffic to the processor. The traffic may comprise various types of content, as described above. The processor may determine the content type of the content in the traffic in various ways. For example, the processor may implement deep packet inspection (DPI) to determine a type of content in the traffic, or may determine the type of content from information contained in packet headers of the traffic, based upon the sending application on an endpoint device, based upon a port number, and so on.

In another example, the security policy may be provided to components in the network by the processor, in which case one or more of the components in the network may determine that the content in the traffic matches the content type designated in the security policy. In such case, the component detecting the match may notify the processor that the traffic includes content of the content type for storing in the network cache. In still another example, one or more components of the network may determine a content type of content in the traffic and may notify the processor, e.g., without the component of the network determining or being aware of any specifics of the security policy for the endpoint device. In such examples, the components of the network may utilize the same or similar techniques to determine the type of content, e.g., using DPI, packet header inspection, and so forth. In one example, traffic may be encrypted personal health information (PHI). However, to facilitate caching of content comprising encrypted PHI in accordance with the present disclosure, an indicator code (E.G., an alphanumeric code) may be placed in packet headers (or headers of other data units) in order to identify the encrypted content in the traffic as PHI, or a particular type of PHI.

At step 230, the processor may instantiate the network cache when it is determined that the content is of the content type for storing in the network cache. For example, the processor may instruct an SDN controller to configure NFVI, e.g., one or more host devices, to implement a virtual network function (VNF) comprising the network cache. In another example, the processor may itself perform SDN controller functions, and may select one or more available NFVI, send instructions to the NFVI to instantiate a network cache, and so on.

At step 240, the processor may store the content in the network cache when it is determined that the content in the traffic is of the content type for storing in the network cache. For example, the processor may send instructions to one or more other components within the network to divert to the network cache the traffic from the endpoint device and/or the portion of the traffic comprising the content that matches the content type designated in the security policy. The one or more other components may determine the relevant traffic/content in the same manner as described above, e.g., using DPI, packet header inspection, and so forth.

At step 250, the processor may send a notification to a designated device, e.g., a management device, that the content is stored in the network cache. In one example, the designated device may comprise the endpoint device itself. In another example, the designated device may comprise a different device that is associated with a user of the endpoint device. For instance, the endpoint device may comprise a user's mobile phone, while the designated device may comprise the user's home computer. In still another example, the designated device may comprise a device of an enterprise that is associated with the endpoint device. For instance, the endpoint device may be a device of a patient, or a doctor or other medical professional of a hospital. In one example, multiple devices may be designated to receive notifications of the caching of content. Thus, in one example, step 250 may comprise sending notification to any or all of such designated devices.

In one example, the notification may include parameters associated with the content, such as a volume or quantity of the content, the protocol(s) utilized, the IP address(es) and/or the port number(s) contained within headers of data units in the traffic, an identification of the destination device, a file size of at least one file, a file name of at least one file, a file type of at least one file, an identification of an application sending the content from the endpoint device, and so forth. In addition, the notification may solicit a security decision from the designated device, e.g., a response regarding a task, or action to perform with respect to the content that is stored in the network cache.

In one example, a user interface may be provided for the designated device to present the notification. For instance, a screen of the designated device may present the question, "did you send these five audio files?" along with parameters associated with the five audio files. If the user only wanted to send three audio files, the user may see that there are two extra audio files that the endpoint device was attempting to send. The user may then see parameters associated with such content, such as the intended destinations. Thus, it may be seen by the user if the additional audio files were being sent a destination that was not approved by the user. For each audio file, the user may therefore block the further transmission, or allow further transmission towards the destination(s) after reviewing the parameters associated with the content.

At step 260, the processor determines whether a security decision is received from the designated device. The security decision may broadly indicate to allow the content to be sent to a destination device or to stop the content from being sent to the destination device. If a security decision is received, the method may proceed to step 270. Otherwise, if a security decision is not received within a designated time period, the method may proceed to optional step 280.

At step 270, the processor performs a task regarding the content in response to the security decision. For example, the security decision, or response, may request that the content be sent on to the destination, that the content be dropped or blocked, that the content be sent to a security device for further processing, and so forth. Accordingly, the task performed at step 270 may include forwarding the content to the destination device from the network cache, blocking the content, dropping the content, or forwarding the content to a security device from the network cache. If the content is to be forwarded to a security device, the security device may comprise, for example, a device of the processor performing the method 200, a quarantine device, a sandbox device, a device for performing antivirus and/or antimalware scans on the content, and so forth. Following step 270, the method may proceed to optional step 290 or to step 295.

At optional step 280, the processor may perform a default action when a security decision, or response, is not received from the designated device within a designated time period. The designated time period may be set by a network operator/network service provider and/or according to the security policy. The default action may comprise, for example, forwarding the content to the destination device from the network cache, blocking the content, dropping the content, or forwarding the content to a security device from the network cache. Following optional step 280, the method may proceed to optional step 290 or to step 295.

At optional step 290, the processor may release the network cache from a host device when no content of the content type for storing in the network cache is detected in outbound traffic from the endpoint device within a designated time period. The designated time period at optional step 290 may be set by a network operator/network service provider and/or according to the security policy. The designated time period at optional step 290 may be different than the designated time period at optional step 280. As mentioned above, the network cache may be instantiated on NFVI/host device(s) when content of the content type for storing in the network cache is detected in outbound traffic from the endpoint device. However, NFVI/host device resources that are assigned to the network cache may be released back into a pool of available NFVI/host device(s) such that other aspects of the network may utilize the NFVI/host device(s) in a more optimal manner.

Following optional step 290, the method 200 may proceed to step 295. At step 295, the method 200 ends.

It should be noted that the method 200 may be expanded to include additional steps. For instance, in one example the processor may further receive an updated security policy and may apply the updated security policy to additional traffic from the endpoint device. In another example, the method 200 may be expanded to include the processor determining that additional traffic from the endpoint device includes additional content of the content type for storing in the network cache, storing the additional content in the network cache, and sending an additional notification to the designated device that the additional content is stored in the network cache. The additional notification may include parameters associated with the additional content. In addition, the processor may perform a default action, e.g., according to optional step 280, regarding the additional content when no security decision is received from the designated device in response to the additional notification within a designated time period. For example, the processor may forward the additional content to the destination device from the network cache, block the additional content, drop the additional content, or forward the additional content to a security device from the network cache. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

As such, the present disclosure provides at least one advancement in the technical field of electronic content security in a network environment. For instance, examples of the present disclosure include network-based devices for storing content from an endpoint device in a network cache. In particular, examples of the present disclosure implement security policies regarding content in outbound traffic from an endpoint device under the control of the endpoint device, under the control of a device of an enterprise associated with the endpoint device, or under the control of the network. Thus, although an endpoint device may be accessed and/or used in an unintended or impermissible way, and/or in a way that is not easily detected, the exfiltration of content from the endpoint device may be regulated within the network and according to one or more customizable security policies. In addition, embodiments of the present disclosure improve the functioning of a computing device, e.g., a server. Namely, servers dedicated to management and implementation of security policy in a network are improved in the examples of the present disclosure, such as the security detection and intrusion function (SDIF) as described herein, which manages and implements security policies regarding content in outbound traffic from endpoint devices.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for storing content from an endpoint device in a network cache, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for storing content from an endpoint device in a network cache (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for storing content from an endpoint device in a network cache (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
    sending to a security server, by a processor, a security policy for a user endpoint device, the security policy defining a type of content to be stored in a network cache, wherein the network cache is dynamically instantiated by the security server when the security server determines that traffic from the user endpoint device to a destination device includes content of the type of content to be stored in the network cache, wherein the processor is distinct from the user endpoint device and the security server;
    receiving, by the processor, a notification from the security server that the content is currently stored in the network cache, the notification including at least one parameter associated with the content, wherein the user endpoint device is associated with a user; and
    sending, by the processor, a decision to the security server, wherein the decision is for allowing the content to be sent to the destination device from the network cache or for stopping the content from being sent to the destination device.

2. The method of claim 1, wherein the network cache comprises a host device implementing a virtual network function.

3. The method of claim 2, further comprising:
instructing the security server to release the network cache from the host device when no further content of the type of content to be stored in the network cache is detected from the user endpoint device within a designated time period.

4. The method of claim 1, wherein the stopping the content from being sent to the destination device comprises at least one of:
blocking the content;
dropping the content; or
forwarding the content to a security device from the network cache.

5. The method of claim 4, wherein the security device comprises a device in communication with the processor.

6. The method of claim 4, wherein the security device comprises:
a quarantine device; or
a sandbox device.

7. The method of claim 1, wherein the type of content comprises at least one of:
a photographic content;
an image content;
a video content;
an audio content; or
a multimedia content.

8. The method of claim 1, wherein the type of content comprises protected health information.

9. The method of claim 8, wherein the content comprises encrypted traffic, and wherein the content is determined to be the protected health information by an indicator code in packet headers of the traffic.

10. The method of claim 1, wherein the security policy is received from the user endpoint device or from a device of an enterprise that is associated with the user endpoint device.

11. The method of claim 1, wherein the at least one parameter associated with the content comprises at least one of:
a volume of the content;
an identification of the destination device;
a file size of at least one file;
a file name of at least one file;
a file type of at least one file; or
an identification of an application sending the content from the user endpoint device.

12. The method of claim 1, wherein the security policy defines a second type of content for an automatic action.

13. A device deployed in a network, the device comprising:
a processor; and
a non-transitory computer-readable medium storing instructions which, when executed by the processor, cause the processor to perform operations, the operations comprising:
sending to a security server a security policy for a user endpoint device, the security policy defining a type of content to be stored in a network cache, wherein the network cache is dynamically instantiated by the security server when the security server determines that traffic from the user endpoint device to a destination device includes content of the type of content to be stored in the network cache, wherein the processor is distinct from the user endpoint device and the security server;
receiving a notification from the security server that the content is currently stored in the network cache, the notification including at least one parameter associated with the content, wherein the user endpoint device is associated with a user; and
sending a decision to the security server, wherein the decision is for allowing the content to be sent to the destination device from the network cache or for stopping the content from being sent to the destination device.

14. A non-transitory computer-readable medium storing instructions which, when executed by a processor in a network, cause the processor to perform operations, the operations comprising:
sending to a security server a security policy for a user endpoint device, the security policy defining a type of content to be stored in a network cache, wherein the network cache is dynamically instantiated by the security server when the security server determines that traffic from the user endpoint device to a destination device includes content of the type of content to be stored in the network cache, wherein the processor is distinct from the user endpoint device and the security server;
receiving a notification from the security server that the content is currently stored in the network cache, the notification including at least one parameter associated with the content, wherein the user endpoint device is associated with a user; and
sending a decision to the security server, wherein the decision is for allowing the content to be sent to the destination device from the network cache or for stopping the content from being sent to the destination device.

15. The non-transitory computer-readable medium of claim 14, wherein the network cache comprises a host device implementing a virtual network function.

16. The non-transitory computer-readable medium of claim 15, the operations further comprising:
instructing the security server to release the network cache from the host device when no further content of the type of content to be stored in the network cache is detected from the user endpoint device within a designated time period.

17. The non-transitory computer-readable medium of claim 14, wherein the stopping the content from being sent to the destination device comprises at least one of:
blocking the content;
dropping the content; or
forwarding the content to a security device from the network cache.

18. The non-transitory computer-readable medium of claim 17, wherein the security device comprises a device in communication with the processor.

19. The non-transitory computer-readable medium of claim 17, wherein the security device comprises:
a quarantine device; or
a sandbox device.

20. The non-transitory computer-readable medium of claim 14, wherein the type of content comprises at least one of:
a photographic content;
an image content;
a video content;

an audio content; or
a multimedia content.

\* \* \* \* \*